(12) United States Patent
Kim et al.

(10) Patent No.: US 12,704,860 B2
(45) Date of Patent: Aug. 11, 2026

(54) ROBOT AND CONTROLLING METHOD THEREOF

(71) Applicant: SAMSUNG ELECTRONICS CO., LTD., Suwon-si (KR)

(72) Inventors: Duckhwan Kim, Suwon-si (KR); Woojong Yoo, Suwon-si (KR); Junesuk Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 18/624,794

(22) Filed: Apr. 2, 2024

(65) Prior Publication Data

US 2024/0264611 A1 Aug. 8, 2024

Related U.S. Application Data

(63) Continuation of application No. PCT/KR2022/015321, filed on Oct. 12, 2022.

(30) Foreign Application Priority Data

Nov. 24, 2021 (KR) ........................ 10-2021-0163512

(51) Int. Cl.
*G05D 1/698* (2024.01)
*B25J 5/00* (2006.01)
(Continued)

(52) U.S. Cl.
CPC .............. *G05D 1/6985* (2024.01); *B25J 5/00* (2013.01); *B25J 5/007* (2013.01); *B25J 9/0084* (2013.01);
(Continued)

(58) Field of Classification Search
CPC ............. G05D 1/6985; G05D 2105/31; G05D 2107/60; G05D 2109/10; G05D 1/6987;
(Continued)

(56) References Cited

U.S. PATENT DOCUMENTS 7,957,837 B2 6/2011 Ziegler et al.
9,492,922 B1 * 11/2016 Johnson ............... G05D 1/0297
(Continued)

FOREIGN PATENT DOCUMENTS

CN 111212404 A 5/2020
JP 4658892 B2 3/2011
(Continued)

OTHER PUBLICATIONS

International Search Report (PCT/ISA/210) issued by the International Searching Authority on Jan. 20, 2023 in International Application No. PCT/KR2022/015321.
(Continued)

*Primary Examiner* — Sohana Tanju Khayer
(74) *Attorney, Agent, or Firm* — Sughrue Mion, PLLC

(57) ABSTRACT

A robot includes: a communication interface, a memory, and a processor configured to: transmit identification information and state information of the robot to an external server; based on receiving, from the external server, first information including identification information, type information and state information of at least one other robot, store the first information in the memory, based on identifying that an error occurred in communication with the external server, determine whether the robot is to operate as a master robot by comparing the type information and the state information of the at least one other device with type information and first state information of the robot; based on the robot operating as the master robot, plan a movement route of the at least one other robot based on task information of the at least one other robot, and transmit he planned movement route to the at least one other robot.

16 Claims, 12 Drawing Sheets

(51) Int. Cl.

| | |
|---|---|
| ***B25J 9/00*** | (2006.01) |
| ***B25J 9/16*** | (2006.01) |
| ***B25J 11/00*** | (2006.01) |

(52) U.S. Cl.

CPC ........... *B25J 9/1664* (2013.01); *B25J 9/1682* (2013.01); *B25J 11/0045* (2013.01); *B25J 11/008* (2013.01); *G05B 2219/40417* (2013.01)

(58) Field of Classification Search

CPC . G05D 1/2274; B25J 5/00; B25J 5/007; B25J 9/0084; B25J 9/1664; B25J 9/1682; B25J 11/0045; B25J 11/008; G05B 2219/40417

See application file for complete search history.

(56) References Cited

U.S. PATENT DOCUMENTS

| | | | | |
|---|---|---|---|---|
| 9,606,543 | B2 | 3/2017 | Jeon et al. | |
| 10,580,301 | B2 | 3/2020 | Anvari | |
| 10,821,609 | B2 | 11/2020 | Tokuhashi et al. | |
| 11,285,608 | B2 | 3/2022 | Jea et al. | |
| 2016/0026187 | A1 | 1/2016 | Alam et al. | |
| 2016/0354923 | A1 | 12/2016 | Kuffner, Jr. et al. | |
| 2017/0285635 | A1* | 10/2017 | Sisbot | G06Q 10/06311 |
| 2018/0279847 | A1* | 10/2018 | Park | A47L 9/2857 |
| 2019/0129445 | A1* | 5/2019 | Koo | B25J 9/1664 |
| 2019/0232810 | A1* | 8/2019 | Itoh | H02J 7/0013 |
| 2019/0283255 | A1 | 9/2019 | Wang | |
| 2021/0065556 | A1 | 3/2021 | Aijaz | |
| 2021/0247776 | A1* | 8/2021 | Faye | H04L 9/3271 |
| 2021/0255618 | A1* | 8/2021 | Lenz | G05D 1/0027 |
| 2021/0295620 | A1* | 9/2021 | Cui | B60W 60/00186 |
| 2021/0365046 | A1* | 11/2021 | Sohn | G05D 1/0297 |
| 2021/0373576 | A1* | 12/2021 | Sohn | B25J 11/008 |
| 2022/0100571 | A1* | 3/2022 | Ohtsuka | G06F 9/5027 |
| 2022/0283797 | A1* | 9/2022 | Nagamitsu | G06F 8/65 |
| 2022/0305664 | A1* | 9/2022 | Ikeda | B25J 5/007 |
| 2022/0324646 | A1* | 10/2022 | Sohn | G06Q 30/0601 |
| 2023/0105048 | A1* | 4/2023 | Yahata | B25J 9/0003 705/2 |

FOREIGN PATENT DOCUMENTS

| | | | |
|---|---|---|---|
| JP | 4713846 | B2 | 6/2011 |
| KR | 10-2013-0068248 | A | 6/2013 |
| KR | 10-1309527 | B1 | 9/2013 |
| KR | 10-2015-0044562 | A | 4/2015 |
| KR | 10-2015-0061398 | A | 6/2015 |
| KR | 10-2015-0137166 | A | 12/2015 |
| KR | 10-1668078 | B1 | 10/2016 |
| KR | 10-2021-0099218 | A | 8/2021 |

OTHER PUBLICATIONS

Written Opinion (PCT/ISA/237) issued by the International Searching Authority on Jan. 20, 2023 in International Application No. PCT/KR2022/015321.

Communication dated Oct. 24, 2024, issued by the European Patent Office IN European Patent Application No. 22898834.1.

Communication dated Apr. 3, 2025 by the European Patent Office in European Application No. 22898834.1.

Communication dated Oct. 30, 2025 issued by the European Patent Office in European Patent Application No. 22898834.1.

Office Action dated Mar. 10, 2026, issued by the Korean Ministry of Intellectual Property in Korean Patent Application No. 10-2021-0163512.

* cited by examiner

ROBOT AND CONTROLLING METHOD THEREOF

CROSS-REFERENCE TO RELATED APPLICATION(S)

This application is a by-pass continuation application of International Application No. PCT/KR2022/015321, filed on Oct. 12, 2022, which is based on and claims priority to Korean Patent Application No. 10-2021-0163512, filed on Nov. 24, 2021, in the Korean Intellectual Property Office, the disclosures of which are incorporated by reference herein in their entireties.

BACKGROUND ART

1. Field

The disclosure relates to a robot providing a service to a user, and a controlling method thereof.

2. Description of Related Art

Recently, development of technologies for robots that are utilized in indoor spaces and provide services to users is actively going on. In case a plurality of robots are arranged in an indoor space and provide services, the plurality of robots may provide services corresponding to specific tasks allotted from an external server managing the robots.

However, in case an error occurs in communication between a robot and an external server, there is a problem that a conventional robot cannot be allotted a task from the external server, and thus cannot provide a service smoothly. Accordingly, there has been a continuous demand for a method for a plurality of robots to provide services to a user by collaborating without an intervention from an external server.

SUMMARY

According to an aspect of the disclosure, a robot includes: a communication interface; a memory storing at least one instruction; and at least one processor configured to execute the at least one instruction to: transmit first identification information of the robot and first state information of the robot to an external server via the communication interface, based on receiving, from the external server via the communication interface, first information including second identification information of at least one other robot, second type information of the at least one other robot, and second state information of the at least one other robot, store the first information in the memory, based on identifying that an error occurred in communication with the external server via the communication interface, determine whether the robot is to operate as a master robot by comparing the second type information and the second state information with first type information of the robot and the first state information, respectively, based on determining that the robot is to operate as the master robot, plan a movement route of the at least one other robot based on task information of the at least one other robot, and transmit, via the communication interface, the planned movement route to the at least one other robot.

The at least one processor may be further configured to execute the at least one instruction to: based on the second type information and the first type information, identify at least one candidate robot from among the at least one other robot and the robot, and determine whether the robot is to operate as the master robot based on state information of the at least one candidate robot.

The at least one processor may be further configured to execute the at least one instruction to identify a guide type robot as the at least one candidate robot based on the second type information and the first type information.

Each of the first state information and the second state information may include: at least one of information about a battery remaining amount, information related to performance of a task, or error information, and the at least one processor may be further configured to execute the at least one instruction to: identify, from among the at least one candidate robot, at least one robot having a battery remaining amount greater than or equal to a threshold value based on the information about the battery remaining amount of the at least one candidate robot, and determine whether the robot is to operate as the master robot based on at least one of the information related to performance of the task of the at least one identified robot or the error information of the at least one identified robot.

The at least one processor may be further configured to execute the at least one instruction to: based on receiving, from the external server via the communication interface, second information including the second identification information, the second type information, the second state information, and driving information about the planned movement route of the at least one other robot, update information of the at least one other robot stored in the memory based on the received second information, and based on identifying that an error occurred in the communication with the external server via the communication interface, determine whether the robot is to operate as the master robot based on a most recently updated information stored in the memory based on a time point when the communication error occurred.

The at least one processor may be further configured to execute the at least one instruction to, based on identifying that the communication error with the external server is due to an error in the external server, determine whether the robot is to operate as the master robot by comparing the second type information and the second state information with the first type information and the first state information, respectively.

The at least one processor may be further configured to execute the at least one instruction to: based on the robot operating as the master robot, request from the at least one other robot, second information including the second state information, environment information, and driving information about the planned movement route of the at least one other robot, correct the planned movement route of the at least one other robot based on the received second information, and transmit, via the communication interface, the corrected planned movement route to the at least one other robot.

The environment information may include at least one of location information of the at least one other robot, road condition information around the at least one other robot, obstacle type information, or distance information from an obstacle.

The at least one processor may be further configured to execute the at least one instruction to, based on identifying that the robot is not the master robot, transmit, via the communication interface, the first state information and environment information of the robot.

According to an aspect of the disclosure, a method of controlling a robot, includes: transmitting first identification information of the robot and first state information of the robot to an external server; based on receiving, from the external server, first information including second identification information of at least one other robot, second type information of the at least one other robot, and second state information of the at least one other robot, storing the received first information; based on identifying that an error occurred in communication with the external server, determining whether the robot is to operate as a master robot by comparing the second type information and the second state information with first type information of the robot and the first state information; based on determining that the robot is to operate as the master robot, planning a movement route of the at least one other robot based on task information of the at least one other robot; and transmitting the planned movement route to the at least one other robot.

The determining whether the robot is to operate as the master robot may include: based on the second type information and the first type information, identifying at least one candidate robot from among the at least one other robot and the robot; and determining whether the robot is to operate as the master robot based on state information of the at least one candidate robot.

The identifying the at least one candidate robot may include identifying a guide type robot as the at least one candidate robot based on the second type information and the first type information.

Each of the first state information and the second state information may include: at least one of information about a battery remaining amount, information related to performance of a task, or error information, and the determining whether the robot is to operate as the master robot may include: identifying, from among the at least one candidate robot, at least one robot having a battery remaining amount greater than or equal to a threshold value based on the information about the battery remaining amount of the at least one candidate robot; and determining whether the robot is to operate as the master robot based on at least one of the information related to performance of the task of the at least one identified robot or the error information of the at least one identified robot.

The determining whether the robot is to operate as the master robot may include: based on receiving, from the external server, second information including the second identification information, the second type information, the second state information, and driving information about the planned movement route of the at least one other robot, updating the stored information based on the received second information; and based on identifying that the error occurred in the communication with the external server, determining whether the robot is to operate as the master robot based on most recent updated information based on a time point when the communication error occurred.

The determining whether the robot is to operate as the master robot may include, based on identifying that the communication error with the external server is due to an error in the external server, determining whether the robot is to operate as the master robot by comparing the second type information and the second state information with the first type information and the first state information.

The method may further include: based on the robot operating as the master robot, requesting, from the at least one other robot, second information including the second state information, environment information, and driving information about the planned movement route of the at least one other robot; correcting the planned movement route of the at least one other robot based on the received second information of the at least one other robot; and transmitting the corrected planned movement route of the at least one other robot to the at least one other robot.

The environment information may include at least one of location information of the at least one other robot, road condition information around the at least one other robot, obstacle type information, or distance information from an obstacle.

The method may further include, based on identifying that the robot is not the master robot, transmitting the first state information and environment information of the robot.

BRIEF DESCRIPTION OF THE DRAWINGS

The above and other aspects, features, and advantages of certain embodiments of the present disclosure are more apparent from the following description taken in conjunction with the accompanying drawings, in which.

DETAILED DESCRIPTION

Figure 1:
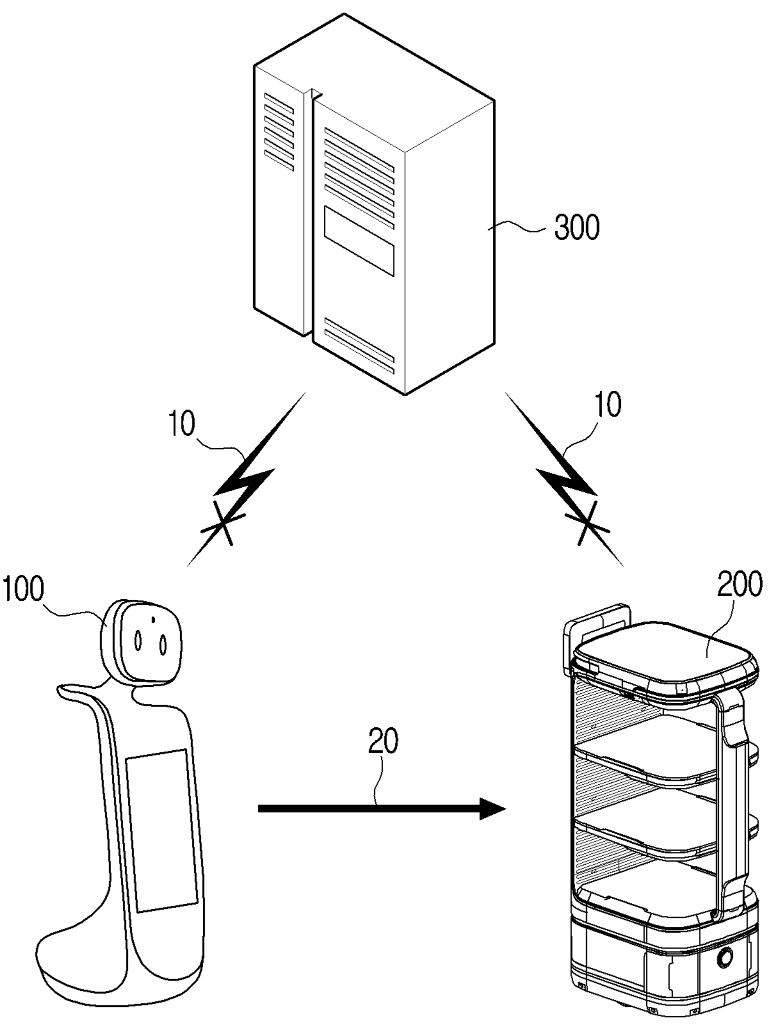
FIG. 1 is a diagram for schematically illustrating a process of providing a service by a robot according to one or more embodiments.

Hereinafter, example embodiments of the disclosure will be described in detail with reference to the accompanying drawings.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions, or emergence of new technologies, etc. Also, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, but not just based on the names of the terms.

Also, in the disclosure, expressions such as "have," "may have," "include," and "may include" denote the existence of such characteristics (e.g., elements such as numbers, functions, operations, and components, etc.), and do not exclude the existence of additional characteristics.

In addition, the expressions "at least one of A and B" or "at least one of A or B" should be interpreted to mean any one of "A" or "B" or "A and B."

Further, the expressions "first," "second," and the like used in the disclosure may be used to describe various elements regardless of any order and/or degree of importance. Also, such expressions are used only to distinguish one element from another element, and are not intended to limit the elements.

The description in the disclosure that one element (e.g., a first element) is "(operatively or communicatively) coupled with/to" or "connected to" another element (e.g., a second element) should be interpreted to include both the case where the one element is directly coupled to the another element, and the case where the one element is coupled to the another element through still another element (e.g., a third element).

Also, singular expressions include plural expressions, unless defined obviously differently in the context. In addition, in the disclosure, terms such as "include" or "consist of" should be construed as designating that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

Further, in the disclosure, "a module" or "a part" performs at least one function or operation, and may be implemented as hardware or software, or as a combination of hardware and software. In addition, a plurality of "modules" or "parts" may be integrated into at least one module and implemented as at least one processor, except "a module" or "a part" that needs to be implemented as specific hardware.

Also, in the disclosure, 'a user' may mean a person who is provided with a service from a robot, but is not limited thereto.

FIG. 1 is a diagram for schematically illustrating a process of providing a service by a robot according to one or more embodiments.

The robot 100 according to one or more embodiments may be arranged in a space, and may provide various services to a user who lives in the space or temporarily visited the space. The robot 100 may provide a service corresponding to at least one of cleaning, guide, serving, patrol, or handling of an urgent situation, but is not limited thereto.

Also, in the space, at least one other robot 200 other than the robot 100 may be arranged, and the robot 100 and the at least one other robot 200 may provide services to a user through mutual collaboration. Here, service provision through collaboration may mean that the robot 100 and the at least one other robot 200 provide services that are mutually related, as the robot 100 and the at least one other robot 200 are controlled based on information on tasks that are mutually related.

The at least one other robot 200 may be a robot having the same specification as the robot 100, but it may be a robot having a different specification from the robot 100.

According to one or more embodiments, the plurality of robots 100, 200 may be controlled by an external server 300. The plurality of robots 100, 200 may communicate with the external server 300. For example, the plurality of robots 100, 200 and the external server 300 may communicate by a transmission control protocol/Internet protocol (TCP/IP) method.

The external server 300 may transmit task information corresponding to each of the plurality of robots 100, 200 to each robot 100, 200. Here, the task information may include information on the types of the tasks and the movement routes, but is not limited thereto, and the task information may include all information related to performance of the tasks by the plurality of robots 100, 200.

The plurality of robots 100, 200 that received the task information from the external server 300 may provide services based on the received task information. For example, the robot 100 may be controlled by the external server 300 and provide a service corresponding to a guide or a patrol task to the user, and the at least one other robot 200 may be controlled by the external server 300 and provide a service corresponding to a serving or a cleaning task.

In case an error occurred in the external server 300, an error 10 may occur between communication between the plurality of robots 100, 200 and the external server 300. According to one or more embodiments, at least one robot from among the plurality of robots 100, 200 that communicate with the external server 300 by a TCP/IP method may identify the error 10 that occurred in the communication with the external server 300.

In this case, the robot 100 may operate as a master robot for controlling the plurality of robots 100, 200, and control at least one other robot 200. The at least one other robot 200 may identify by itself that it is not a master robot, and transmit state information and environment information corresponding to the at least one other robot 200 to the master robot 100.

The robot 100 operating as the master robot may acquire task information for controlling the at least one other robot 200 based on the state information and the environment information corresponding to the at least one other robot 200, and transmit 20 the acquired task information to the at least one other robot 200.

Accordingly, the at least one other robot 200 that received 20 the task information from the robot 100 may provide a service based on the task information, and service provision through the plurality of robots 100, 200 may be performed smoothly in spite of the error 10 that occurred in the communication with the external server 300.

Hereinafter, one or more embodiments wherein a master robot is designated in case an error occurred in communication between the plurality of robots and the external server, and the master robot provides a service by controlling the plurality of robots will be described in more detail.

Figure 2:
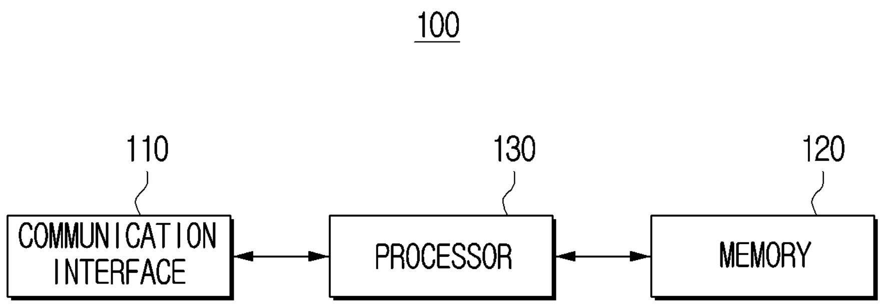
FIG. 2 is a block diagram for illustrating a configuration of a robot according to one or more embodiments.

FIG. 2 is a block diagram for illustrating a configuration of a robot according to one or more embodiments.

The communication interface 110 may input and output various types of data. For example, the communication interface 110 may transmit and receive various types of data with an external device (e.g., a source device), an external storage medium (e.g., a USB memory), an external server (e.g., a webhard) through communication methods such as Wi-Fi based on AP (Wi-Fi, a wireless LAN network), Bluetooth, Zigbee, a wired/wireless local area network (LAN), a wide area network (WAN), an Ethernet, IEEE 1394, a high-definition multimedia interface (HDMI), a universal serial bus (USB), a mobile high-definition link (MHL), Audio Engineering Society/European Broadcasting Union (AES/EBU), optical, coaxial, for example.

In case a user controls the robot 100 remotely, the communication interface 110 may include a receiver for receiving a control signal transmitted from the remote control device manipulated by the user.

The memory 120 may store data for one or more embodiments. The memory 120 may be implemented in a form of a memory embedded in the robot 100, or in a form of a memory that can be attached to or detached from the robot 100, according to the usage of stored data. For example, in the case of data for operating the robot 100, the data may be stored in a memory embedded in the robot 100, and in the case of data for an extended function of the robot 100, the data may be stored in a memory that can be attached to or detached from the robot 100. In the case of a memory embedded in the robot 100, the memory may be implemented as at least one of a volatile memory (e.g., a dynamic RAM (DRAM), a static RAM (SRAM), or a synchronous dynamic RAM (SDRAM), for example) or a non-volatile memory (e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., NAND flash or NOR flash, for example), a hard drive, or a solid state drive (SSD)). Also, in the case of a memory that can be attached to or detached from the robot 100, the memory may be implemented in forms such as a memory card (e.g., compact flash (CF), secure digital (SD), micro secure digital (Micro-SD), mini secure digital (Mini-SD), extreme digital (xD), a multimedia card (MMC), for example), an external memory that can be connected to a USB port (e.g., a USB memory), for example.

The processor 130 controls the overall operations of the robot 100. The processor 130 may be connected with each component of the robot 100, and control the overall operations of the robot 100. For example, the processor 130 may be connected with the communication interface 110 and the memory 120, and control the operations of the robot 100.

According to one or more embodiments, the processor 130 may be referred to by various names such as a digital signal processor (DSP), a microprocessor, a central processing unit (CPU), a micro controller unit (MCU), a micro processing unit (MPU), a neural processing unit (NPU), a controller, an application processor (AP), for example, but in this specification, it will be described as the processor 130.

The processor 130 may be implemented as a system on chip (SoC), and large scale integration (LSI), or implemented in the form of a field programmable gate array (FPGA). Also, the processor 130 may include a volatile memory such as an SRAM, for example.

The processor 130 according to one or more embodiments may transmit identification information of the robot 100 and state information of the robot 100 to the external server via the communication interface 110. Here, the state information of the robot 100 may include at least one of information about the battery remaining amount of the robot 100, information related to performance of a task by the robot 100, or information about an error of the robot 100. For example, the processor 130 may transmit state information instructing a state wherein the battery remaining amount of the robot 100 is currently 100%, and the robot 100 completed performing a task allotted from the external server, and an error did not occur in the robot 100 to the external server via the communication interface 110.

Also, the processor 130 may receive identification information of at least one other robot arranged in a space, and type information, state information, and driving information about a planned movement route of the at least one other robot corresponding to the identification information via the communication interface 110, and store the received information in the memory 120.

Here, the type information may include information on at least one type among a guide type, a serving type, or a robot arm type, and the state information may include at least one of information about a battery remaining amount, information related to performance of a task, or error information, but the disclosure is not limited thereto.

If the type information, the state information, and the driving information about the planned movement route regarding the at least one other robot have already been received from the external server and stored in the memory 120, the processor 130 may update the pre-stored information in the memory 120 based on newly received information. According to one or more embodiments, an operation of updating the pre-stored information in the memory 120 based on information received from the external server can be performed when the robot 100 is implemented as a guide type robot equipped with a hardware specification that can operate as a master robot, but the disclosure is not necessarily limited thereto.

In case an error occurred in the external server, the processor 130 may identify that an error occurred in communication with the external server via the communication interface 110. The processor 130 may compare the type information and the state information of the at least one other robot received from the external server with the type information and the state information of the robot 100, and determine whether the robot 100 is to operate as the master robot. For example, if it is identified that a communication error with the external server is due to an error of the external server but not an error of the robot 100, the processor 130 may compare the received type information and state information of the at least one other robot with the type information and the state information of the robot 100, and determine whether the robot 100 is to operate as the master robot.

According to one or more embodiments, the processor 130 may compare the information that was updated on the nearest time point to the time point when the communication error with the external server occurred from among the updated type information and state information of the at least one other robot with the type information and the state information of the robot 100, and determine whether the robot 100 is to operate as the master robot.

For example, in case the robot 100 is a guide type robot, the processor 130 may identify a robot of a guide type among the at least one other robot, and decide the identified robot of a guide type and the robot 100 as candidate robots to operate as the master robot. Also, the processor 130 may identify at least one robot having a battery amount greater than or equal to a threshold value based on state information corresponding to each of the candidate robots, and determine whether the robot 100 is to operate as the master robot based on the remaining state information excluding the battery remaining amount information among the state information corresponding to the identified at least one robot.

In case the robot 100 operates as the master robot, the processor 130 may plan a movement route of the at least one other robot based on task information corresponding to the at least one other robot. Here, the processor 130 may receive the task information from the external server via the communication interface 110, but may acquire the task information based on at least one of the type information of the plurality of robots including the robot 100 and map data corresponding to the space wherein the plurality of robots are located, information about a service request by the user, or various context information related to service provision.

The processor 130 may plan an optimal movement route wherein the robot 100 and the at least one other robot can provide services without colliding with each other based on the task information corresponding to the robot 100 and the at least one other robot, and the map data corresponding to the space wherein the robot 100 is located. Here, the map data may include a plurality of environment information including location information corresponding to each of the plurality of robots and information about obstacles located within a threshold distance from each robot.

Also, in case the robot 100 operates as the master robot, the processor 130 may request the state information, the environment information, and the driving information about the planned movement route of the at least one other robot to the at least one other robot. When the state information, the environment information, and the driving information about the planned movement route are received from the at least one other robot, the processor 130 may correct the planned movement route related to service provision of the plurality of robots based on the received information, and transmit the corrected movement route to the at least one other robot via the communication interface 110.

Here, the environment information of the at least one other robot may include at least one of location information of the at least one other robot, road condition information around the at least one other robot, information about the type of an obstacle located within a threshold distance from the at least one other robot, or information about the distance between the obstacle and the at least one other robot, but is not limited thereto.

According to one or more embodiments, in case the robot 100 operates as the master robot, the processor 130 may correct the movement route of the at least one other robot in case all or some of the movement route of the at least one other robot is included in an area wherein it is difficult for the at least one other robot to drive (e.g., an area wherein climbing is impossible) based on the road condition information around the at least one other robot, and transmit the corrected movement route to the at least one other robot via the communication interface 110.

The at least one other robot that received the corrected movement route from the robot 100 may provide a service while driving based on the corrected movement route.

In case the robot 100 does not operate as the master robot, the processor 130 may transmit the state information and the environment information of the robot 100 via the communication interface 110. For example, the processor 130 may identify a robot operating as the master robot among the plurality of robots, and transmit the state information and the environment information of the robot 100 to the identified robot, or broadcast the state information and the environment information of the robot 100 without identifying the robot operating as the master robot.

Figure 3:
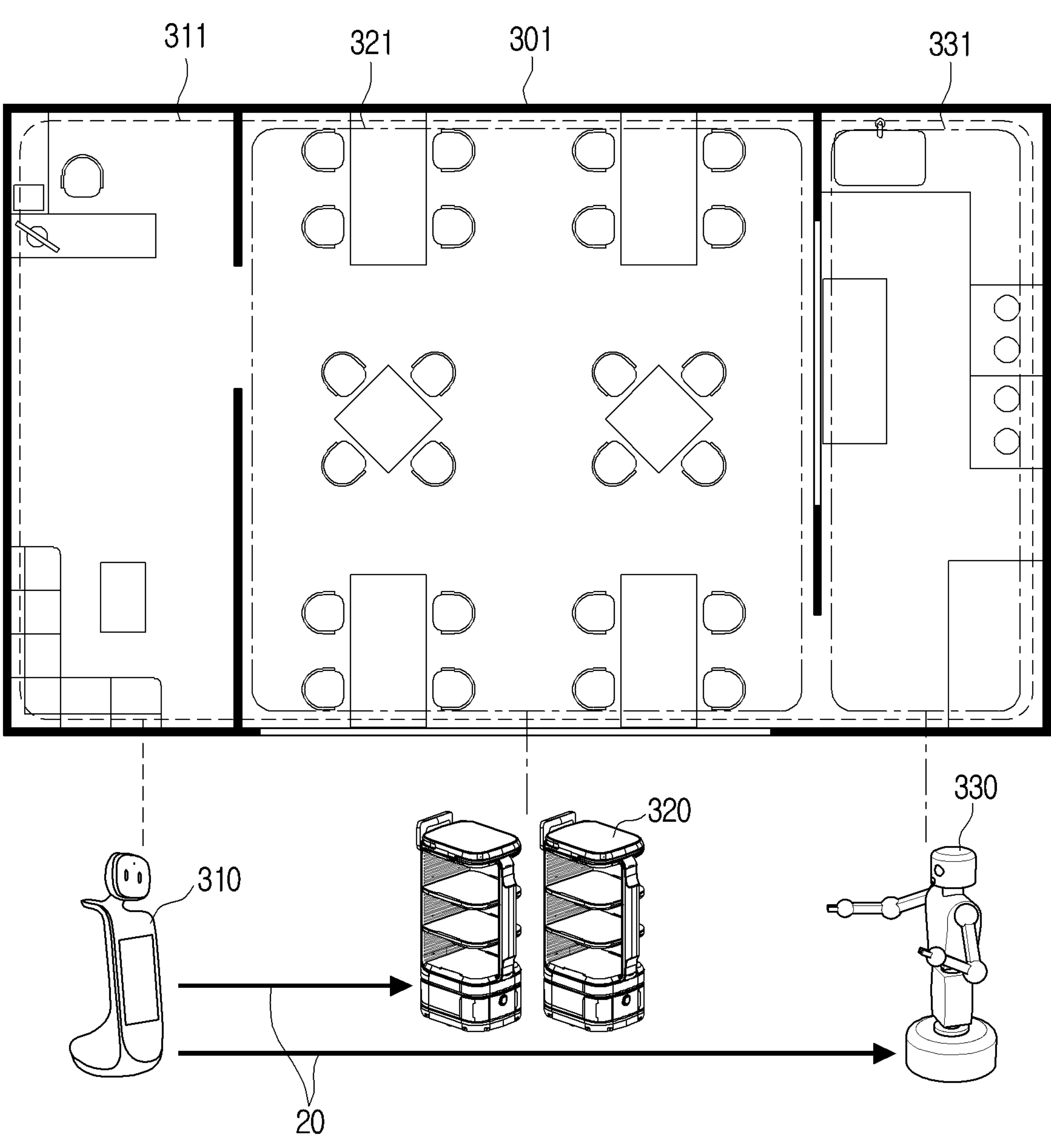
FIG. 3 is a diagram for illustrating a method of designating a master robot based on a difference in a service provision range corresponding to a type of a robot according to one or more embodiments.

FIG. 3 is a diagram for illustrating a method of designating a master robot based on a difference in a service provision range corresponding to a type of a robot according to one or more embodiments.

According to one or more embodiments, in case an error occurred in the external server controlling the robot, various standards may be applied in a process of designating a master robot among a plurality of robots that are located in an indoor space and provide services. For example, the plurality of robots may identify a robot to operate as the master robot based on type information corresponding to each robot.

According to FIG. 3, a restaurant 301 providing services through robots may include three areas corresponding to a counter, a hall, and a kitchen from the left side. A plurality of robots 310, 320, 330 arranged in the restaurant 301 may include a guide type robot 310, a serving type robot 320, and a robot arm type robot 330.

The guide type robot 310 may perform an interaction with a user, and perform a task of providing information related to services to the user. For example, the guide type robot 310 may inform a customer who visited the restaurant 301 of the waiting time or guide the customer to a designated seat in the hall, and perform a task of notifying servers in the restaurant 301 of information about the order of the customer.

The serving type robot 320 may perform a task of carrying an object related to service provision through driving. For example, the serving type robot 320 may perform a task of serving food cooked in the kitchen to a customer, or taking the dishes from the customer who finished eating and carrying the dishes to the kitchen. For this, the serving type robot 320 may include at least one storage space.

The robot arm type robot 330 may not perform driving related to service provision, but perform a task of carrying an object related to service provision. For example, the robot arm type robot 330 may perform a task of loading food cooked in the kitchen in the storage space of the serving type robot 320, or moving the dishes carried from the customer who finished eating to the sink hole. For this, the robot arm type robot 330 may include a robot arm including at least one joint.

Here, each robot 310, 320, 330 may have a predetermined service provision range corresponding to the robot type. The guide type robot 310 may provide services across the counter, the hall, and the kitchen, and the serving type robot 320 may provide services across the hall and the kitchen, and the robot arm type robot 330 may provide services in the kitchen. Accordingly, a service provision range 311 of the guide type robot 310 may include wider areas than a service provision range 321 of the serving type robot 320 or a service provision range 331 of the robot arm type robot 330.

Because of the characteristic of the master robot of having to continuously perform communication with each robot for controlling the plurality of robots 310, 320, 330, it may be effective that the guide type robot 310 that has a wide service provision range and can move to various locations in the restaurant 301 operates as the master robot.

Accordingly, the guide type robot 310 may identify that the guide type robot 310 itself operates as the master robot based on the type information of the plurality of robots 310, 320, 330, and transmit 20 control signals for controlling the serving type robot 320 and the robot arm type robot 330 not operating as the master robot to each robot 320, 330.

Figure 4:
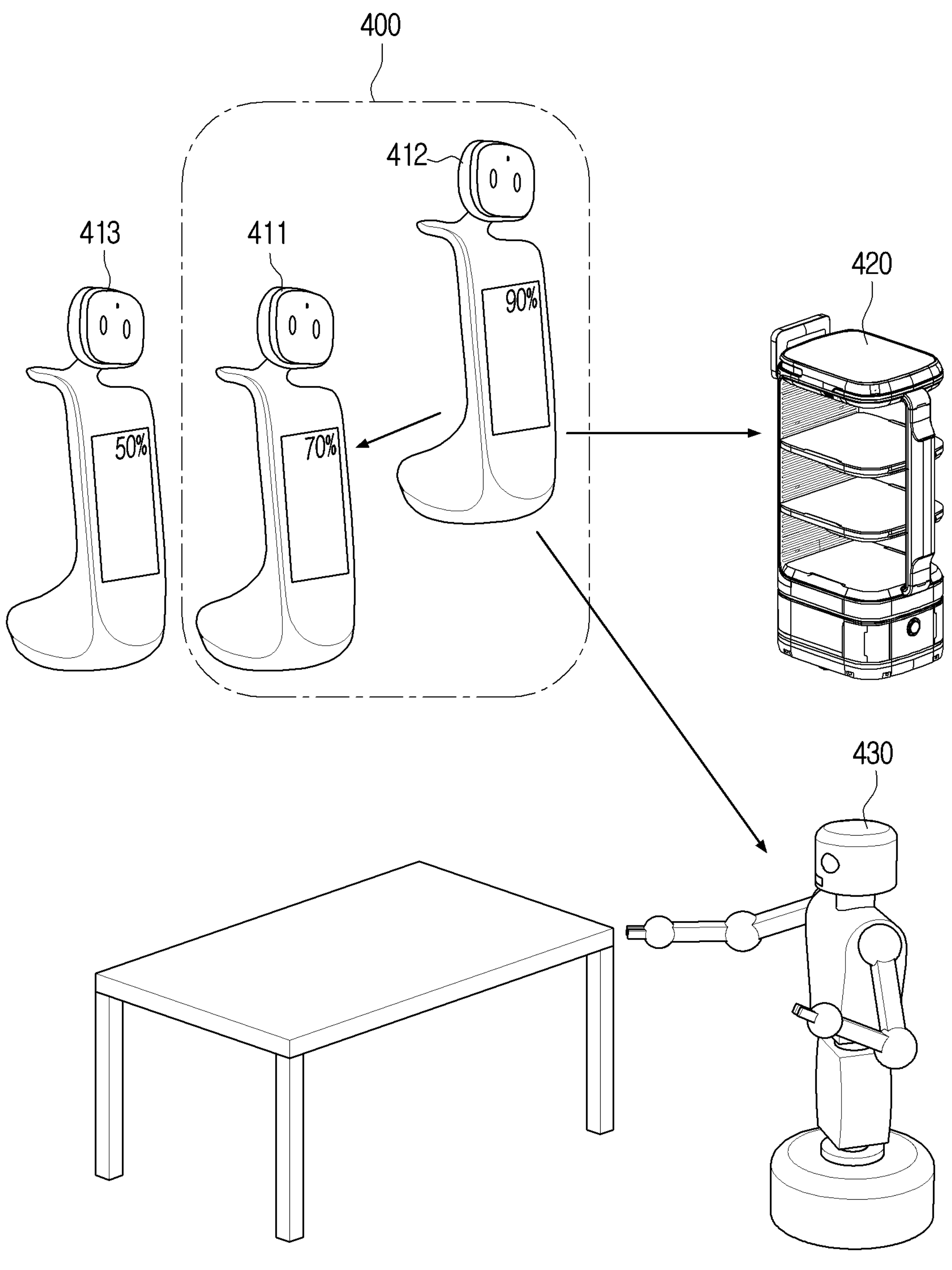
FIG. 4 is a diagram for illustrating a method of designating a master robot among candidate robots according to one or more embodiments.

FIG. 4 is a diagram for illustrating a method of designating a master robot among candidate robots according to one or more embodiments.

According to FIG. 4, the plurality of robots 411, 412, 413, 420, 430 may provide services by collaborating. Here, the plurality of robots 411, 412, 413, 420, 430 may include a plurality of guide type robots 411, 412, 413, a serving type robot 420, and a robot arm type robot 430.

Before an error occurs in communication between the plurality of robots 411, 412, 413, 420, 430 and the external server, the external server may perform a function of gathering identification information, type information, and state information corresponding to the plurality of robots 411,

412, 413, 420, 430 from the plurality of robots 411, 412, 413, 420, 430, and transmitting the information to each robot.

In case it is identified that an error occurred in communication with the external server, each robot may decide a robot to operate as the master robot based on the information that was received the most recently before the communication error occurred among the identification information, the type information, and the state information corresponding to the plurality of robots 411, 412, 413, 420, 430.

For example, before an error occurs in communication with the external server, each robot may periodically receive the identification information, the type information, and the state information corresponding to the plurality of robots 411, 412, 413, 420, 430 from the external server, and update the previous information. In case an error occurred in communication with the external server, each robot may identify the guide type robots 411, 412, 413 among the plurality of robots 411, 412, 413, 420, 430 as candidate robots to operate as the master robot, and decide a robot to operate as the master robot based on the state information of the candidate robots 411, 412, 413 that was updated the most recently before the error occurred.

According to one or more embodiments, each robot may decide a robot to operate as the master robot based on the state information of the candidate robots 411, 412, 413 identified among the information that was updated the most recently before the communication error with the external server occurred. For example, each robot may identify at least one robot 400 having a battery remaining amount of greater than or equal to a threshold value (60%) based on the information about the battery remaining amounts of the candidate robots 411, 412, 413 that was updated the most recently before the error occurred in the communication with the external server. In this process, each robot may identify that the candidate robot 413 having a battery remaining amount smaller than the threshold value (60%) does not operate as the master robot.

Because of the characteristic of the master robot of consuming a lot of power for controlling the plurality of robots 411, 412, 413, 420, 430, it may be effective that a robot having a high battery remaining amount to operate as the master robot. Thus, each robot may decide that the robot 412 having the highest battery remaining amount among the at least one robot 400, identified based on the information about the battery remaining amount of the at least one robot 400 that was updated the most recently before the error occurred in the communication with the external server, operates as the master robot. In this case, the guide type robot 412 operating as the master robot may plan the movement routes of the remaining robots 411, 413, 420, 430 based on task information corresponding to the remaining robots 411, 413, 420, 430, and transmit the planned movement routes to the remaining robots 411, 413, 420, 430.

Figure 5A:
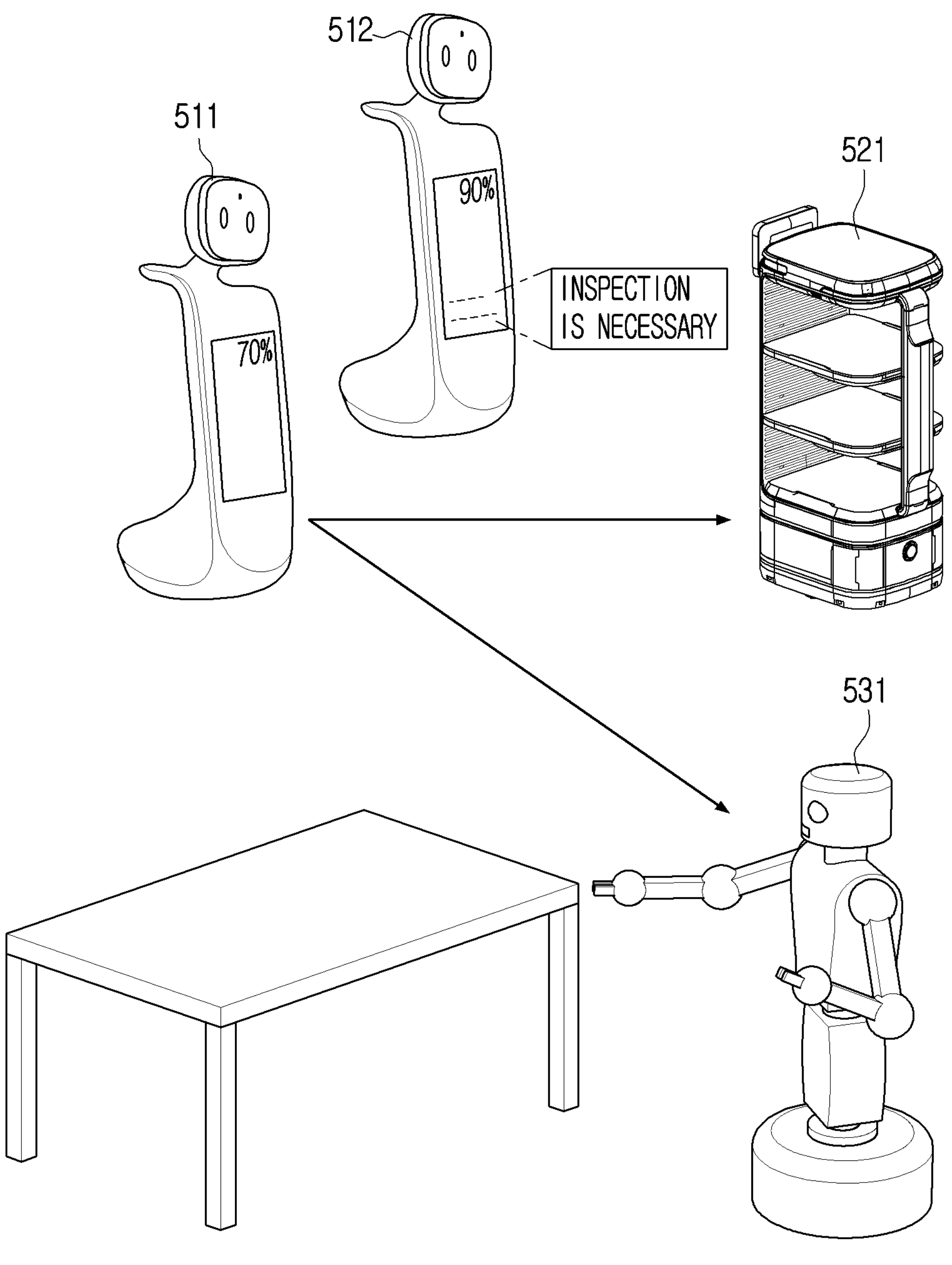
FIG. 5A and FIG. 5B are diagrams for illustrating a method of designating a master robot based on state information of a robot according to one or more embodiments.
Figure 5B:
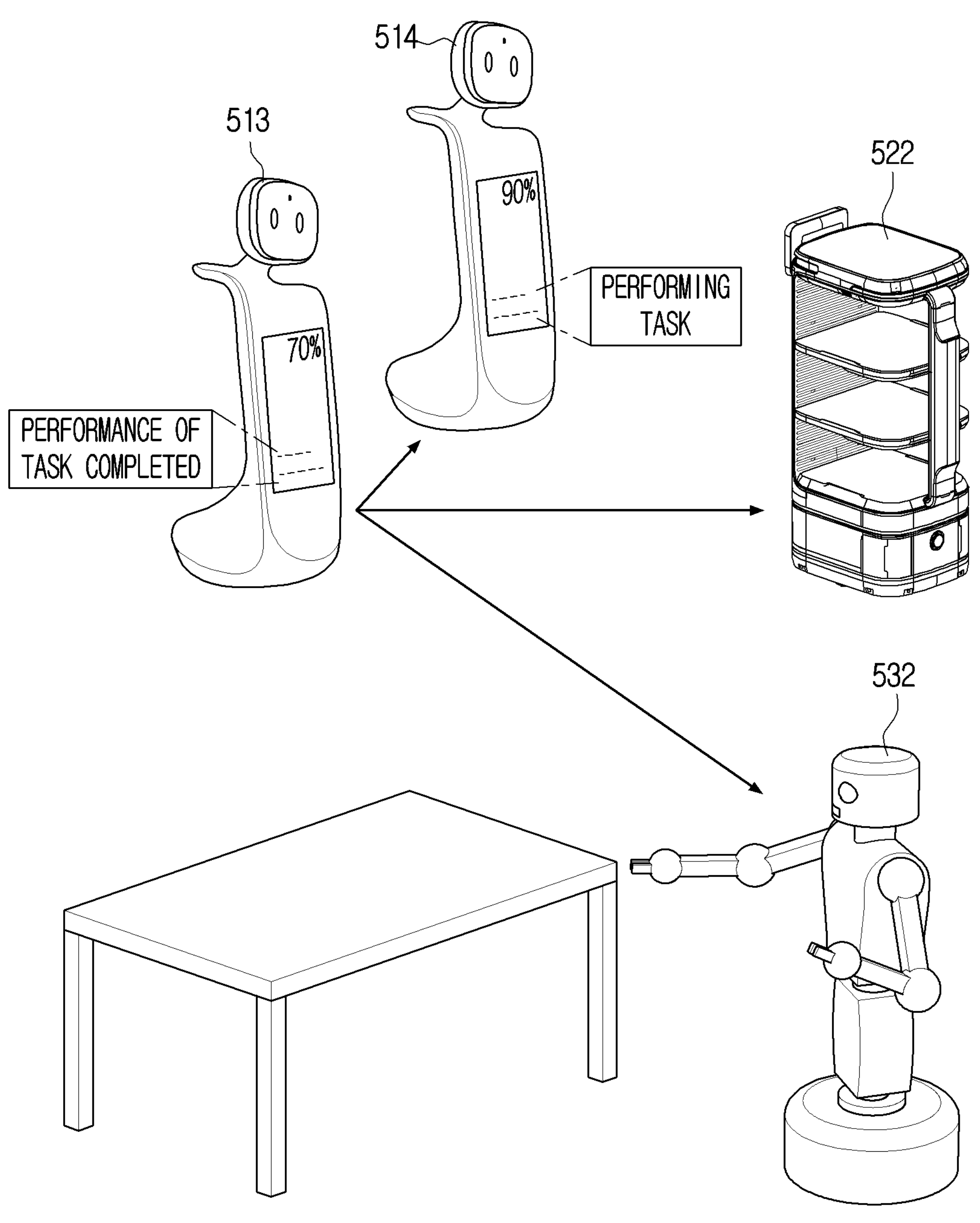

FIG. 5A and FIG. 5B are diagrams for illustrating a method of designating a master robot based on state information of a robot according to one or more embodiments.

According to FIG. 5A, the plurality of robots 511, 512, 521, 531 may provide services by collaborating. Here, the plurality of robots 511, 512, 521, 531 may include a plurality of guide type robots 511, 512, a serving type robot 521, and a robot arm type robot 531.

In case it is identified that an error occurred in communication with the external server, each robot may decide a robot to operate as the master robot based on the information that was received the most recently before the communication error occurred among the identification information, the type information, and the state information corresponding to the plurality of robots 511, 512, 521, 531.

For example, before an error occurs in communication with the external server, each robot may periodically receive the identification information, the type information, and the state information corresponding to the plurality of robots 511, 512, 521, 531 from the external server, and update the previous information. In case an error occurred in communication with the external server, each robot may identify the guide type robots 511, 512 among the plurality of robots 511, 512, 521, 531 as candidate robots to operate as the master robot, and decide a robot to operate as the master robot based on the state information of the candidate robots 511, 512 that was updated the most recently before the error occurred.

According to one or more embodiments, in case the battery remaining amounts of the candidate robots 511, 512 are greater than or equal to the threshold value (60%), each robot may decide the master robot based on the remaining state information excluding the information about the battery remaining amounts of the candidate robots 511, 512 identified among the information that was updated the most recently before the communication error with the external server occurred. For example, each robot may decide the master robot based on error information corresponding to the candidate robots 511, 512 that was updated the most recently before an error occurred in the communication with the external server.

In case an error occurred in the robot 512 having the highest battery remaining amount from among the candidate robots 511, 512, the robot 512 cannot perform a task, and also, a problem may occur in the controlling of the plurality of robots 511, 512, 521, 531 by the robot 512 as the master robot. Accordingly, each robot may decide that the robot 511 that has a relatively low battery remaining amount, but is normally operating as an error did not occur from among the candidate robots 511, 512, based on the error information of the candidate robots 511, 512 that was updated the most recently before the communication error with the external server occurred, operates as the master robot.

In this case, the guide type robot 511 operating as the master robot may plan movement routes of the robots 521, 531 based on task information corresponding to the robots 521, 531 excluding the robot 512 wherein an error occurred among the remaining robots 512, 521, 531, and transmit the planned movement routes to the robots 521, 531.

According to FIG. 5B, the plurality of robots 513, 514, 522, 532 may provide services by collaborating. Here, the plurality of robots 513, 514, 522, 532 may include a plurality of guide type robots 513, 514, a serving type robot 522, and a robot arm type robot 532.

In case it is identified that an error occurred in communication with the external server, each robot may decide a robot to operate as the master robot based on the information that was received the most recently before the communication error occurred among the identification information, the type information, and the state information corresponding to the plurality of robots 513, 514, 522, 532.

For example, before an error occurs in communication with the external server, each robot may periodically receive the identification information, the type information, and the state information corresponding to the plurality of robots 513, 514, 522, 532 from the external server, and update the previous information. In case an error occurred in communication with the external server, each robot may identify the guide type robots 513, 514 among the plurality of robots 513, 514, 522, 532 as candidate robots to operate as the master robot, and decide a robot to operate as the master robot based on the state information of the candidate robots 513, 514 that was updated the most recently before the error occurred.

According to one or more embodiments, each robot may decide the master robot based on the remaining state information excluding the information about the battery remaining amounts of the candidate robots 513, 514 identified among the information that was updated the most recently before the communication error with the external server occurred. For example, each robot may decide the master robot based on information related to performance of tasks corresponding to the candidate robots 513, 514 that was updated the most recently before an error occurred in the communication with the external server.

The robot 514 that could not complete performing the allotted task from among the candidate robots 513, 514 may be a robot that is inappropriate for being designated as the master robot controlling the plurality of robots 513, 514, 522, 532 due to burden of operations (or information processing) required for performing the task. Accordingly, each robot may decide that the robot 513 of which battery remaining amount is relatively low but which completed performing the allotted task from among the candidate robots 513, 514, based on information related to performance of tasks of the candidate robots 513, 514 that was updated the most recently before the communication error with the external server occurred, operates as the master robot.

In this case, the guide type robot 513 operating as the master robot may plan the movement routes of the remaining robots 514, 522, 532 based on task information corresponding to the remaining robots 514, 522, 532, and transmit the planned movement routes to the remaining robots 514, 522, 532.

However, the operation of identifying the master robot according to the disclosure is not limited to the aforementioned content, and it is possible that the robot 514 having a relatively high battery remaining amount from among the candidate robots 513, 514 operates as the master robot, and the other candidate robot 513 performs the task that was previously performed by the master robot 514 instead.

Figure 6A:
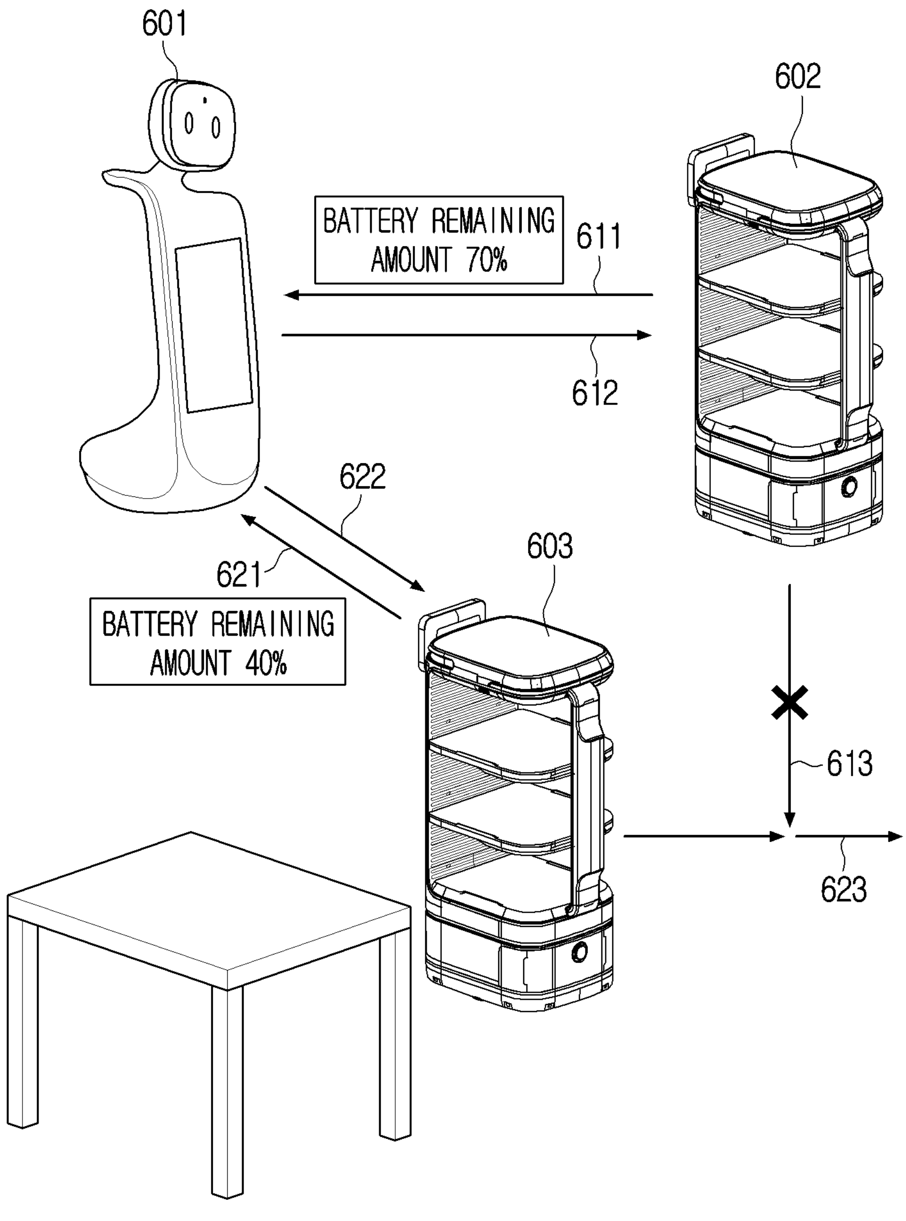
FIG. 6A and FIG. 6B are diagrams for illustrating a method of designating a robot to pass preferentially based on state information of a robot according to one or more embodiments.
Figure 6B:
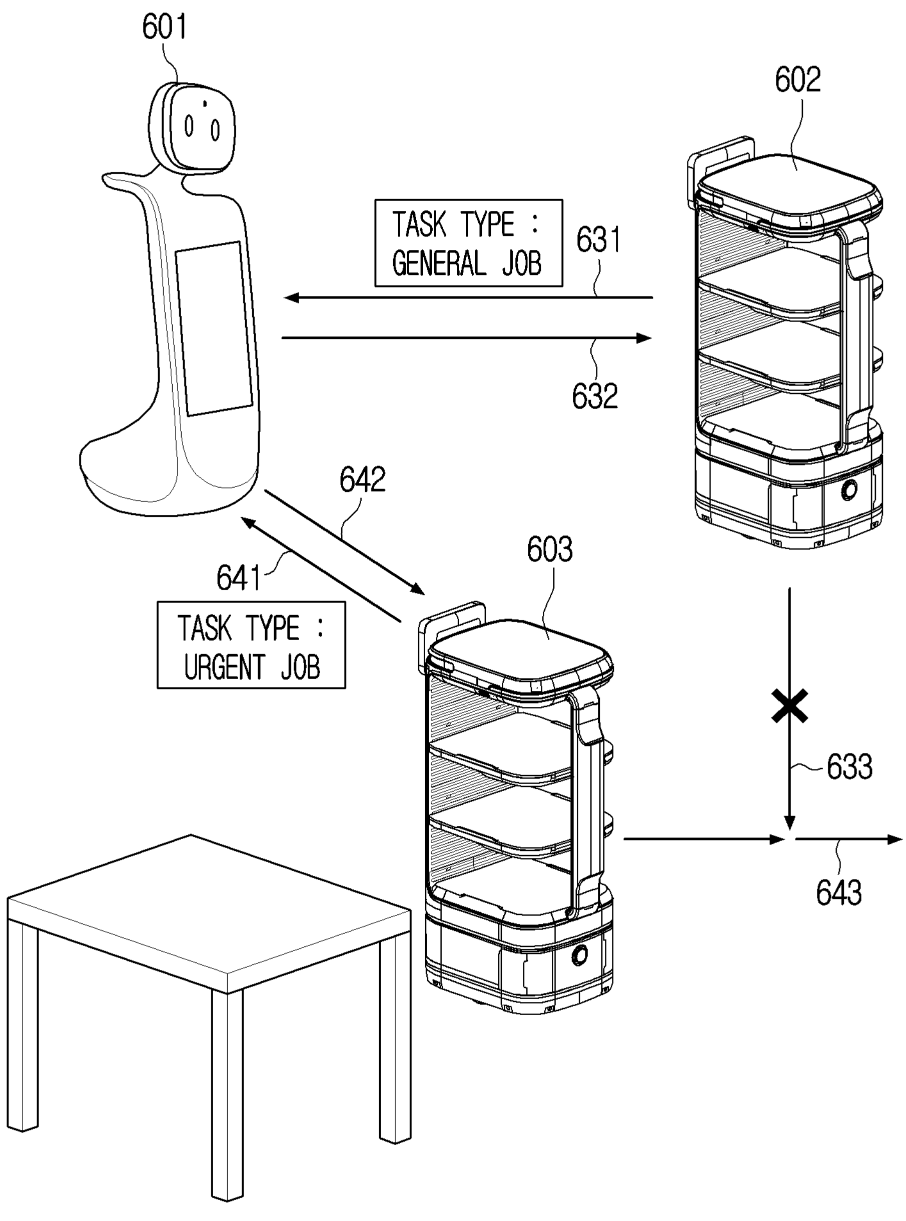

FIG. 6A and FIG. 6B are diagrams for illustrating a method of designating a robot to pass preferentially based on state information of a robot according to one or more embodiments.

In case the plurality of robots resume service provision through control by the master robot after an error occurred in communication with the external server, control for the plurality of robots may be stopped during a period. In this case, as planning of movement routes for the plurality of robots is not performed, the possibility of collision among the robots may become high, and for resolving such a problem, the master robot according to one or more embodiments may request state information, environment information, and driving information about a planned movement route of at least one other robot to the at least one other robot, and correct the previously planned movement route based on the received state information, environment information, and driving information about the planned movement route to prevent collision among the robots.

An operation related to 'correction of a movement route' that will be described below may also include an operation of changing information related to timing of passing through each node other than an operation of changing nodes that the robot passes through while driving.

According to FIG. 6A, in case an error occurred in communication with the external server, the guide type robot 601 may operate as the master robot, and control a plurality of serving type robots 602, 603. In this case, the guide type robot 601 that initiated an operation as the master robot may receive state information, environment information, and driving information about a planned movement route corresponding to each of the plurality of serving type robots 602, 603 from the plurality of serving type robots 602, 603.

Here, the environment information may include location information of the plurality of serving type robots 602, 603 and distance information between the plurality of serving type robots 602, 603, and the driving information about the planned movement route may include information about whether the plurality of serving type robots 602, 603 are driving along the planned movement routes and information on the change of the state of each robot according to driving, for example, but is not limited thereto.

The master robot 601 may determine that the possibility of collision is greater than or equal to a threshold value in case the plurality of serving type robots 602, 603 drive according to the previously planned movement routes, and correct the movement routes of the plurality of serving type robots 602, 603.

For example, the master robot 601 may receive (611) state information instructing that the battery remaining amount of the first serving type robot 602 is 70%, and receive (621) state information instructing that the battery remaining amount of the second serving type robot 603 is 40%. Also, in case the second serving type robot 603 stops and then reoperates based on the driving information of the second serving type robot 603, the master robot 601 may identify that the second serving type robot 603 will be discharged before completing driving of the planned movement route.

A robot having a low battery remaining amount may need to return to a predetermined location (e.g., the battery charging station) swiftly, and thus the master robot 601 may correct the previously planned movement routes to new movement routes for making the second serving type robot 603 having a relatively low battery remaining amount pass preferentially, and stopping the first serving type robot 602 having a relatively high battery remaining amount, and then re-operating the first serving type robot 602.

The master robot 601 may transmit (612) the information about the corrected movement route corresponding to the first serving type robot 602 to the first serving type robot 602, and transmit (622) the information about the corrected movement route corresponding to the second serving type robot 603 to the second serving type robot 603.

As a result, the first serving type robot 602 that moved near a point wherein collision is expected may pass (613) after stopping during a period, and the second serving type robot 603 may pass through (623) the point without stopping.

According to FIG. 6B, the master robot 601 may receive (631) state information instructing that the first serving type robot 602 is performing a task corresponding to a job, and receive (641) state information instructing that the second serving type robot 602 is performing a task corresponding to an urgent job. As a robot performing a task corresponding to an urgent job may need to perform the task swiftly, the master robot 601 may correct the previously planned movement routes to new movement routes for making the second serving type robot 603 performing a task corresponding to an urgent job pass preferentially, and stopping the first serving type robot 602 performing a task corresponding to a job and then re-operating the first serving type robot 602.

The master robot 601 may transmit (632) the movement route information corresponding to the first serving type robot 602 to the first serving type robot 602, and transmit (642) the movement route information corresponding to the second serving type robot 603 to the second serving type robot 603.

As a result, the first serving type robot 602 that moved near the point wherein collision is expected may stop during a period and then pass (633), and the second serving type robot 603 may pass through (643) the point without stopping.

Figure 7:
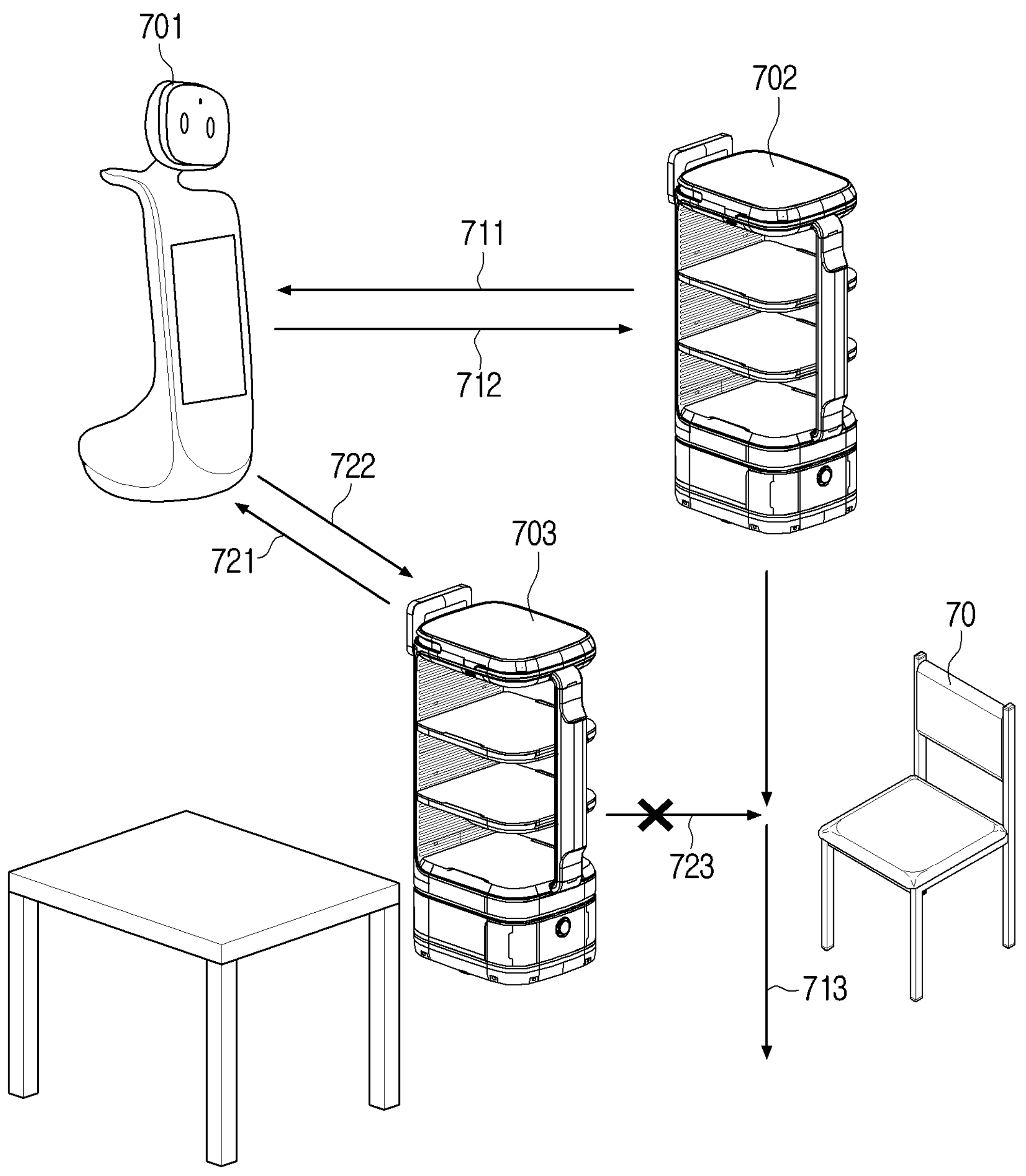
FIG. 7 is a diagram for illustrating a method of designating a robot to pass preferentially based on obstacle information according to one or more embodiments.

FIG. 7 is a diagram for illustrating a method of designating a robot to pass preferentially based on obstacle information according to one or more embodiments.

According to FIG. 7, in case an error occurred in communication with the external server, the guide type robot 701 may control a plurality of serving type robots 702, 703 while operating as the master robot. In this case, the guide type robot 701 that initiated an operation as the master robot may receive state information and environment information corresponding to each of the plurality of serving type robots 702, 703 from the plurality of serving type robots 702, 703.

Here, the environment information may include at least one of location information of the plurality of serving type robots 702, 703, type information of an obstacle 70 located near the plurality of serving type robots 702, 703, or distance information between each robot 702, 703 and the obstacle 70.

In case the plurality of serving type robots 702, 703 drive according to the previously planned movement routes, the master robot 701 may determine that the possibility of collision is greater than or equal to a threshold value, and correct the movement routes of the plurality of serving type robots 702, 703.

For example, the master robot 701 may receive (711) location information of the first serving type robot 702 and environment information instructing that a static obstacle is not located on the movement route of the first serving type robot 702, and receive (721) location information of the second serving type robot 703 and environment information instructing that a static obstacle is located on the movement route of the second serving type robot 703.

The second serving type robot 703 that gets to collide with the obstacle 70 in the case of driving according to the previously planned movement route may need to decelerate regardless of collision with the first serving type robot 702, and thus the master robot 701 may correct the previously planned movement routes to new movement routes for making the first serving type robot 702 that does not have a risk of colliding with the obstacle 70 pass preferentially, and stopping the second serving type robot 703 that has a risk of colliding with the obstacle 70 and then re-operating the second serving type robot 703.

The master robot 701 may transmit (712) the information about the corrected movement route corresponding to the first serving type robot 702 to the first serving type robot 702, and transmit (722) the information about the corrected movement route corresponding to the second serving type robot 703 to the second serving type robot 703.

As a result, the second serving type robot 703 that moved near the point wherein collision is expected may stop during a period and then pass (723), and the first serving type robot 702 may pass through (713) the point without stopping.

In case it is identified that an obstacle located in a space is a dynamic obstacle but not a static obstacle, the master robot 701 may correct the movement routes of the first and second serving type robots 702, 703 by predicting change of the location of the dynamic obstacle based on environment information acquired by the first and second serving type robots 702, 703 in relation to the dynamic obstacle.

Figure 8:
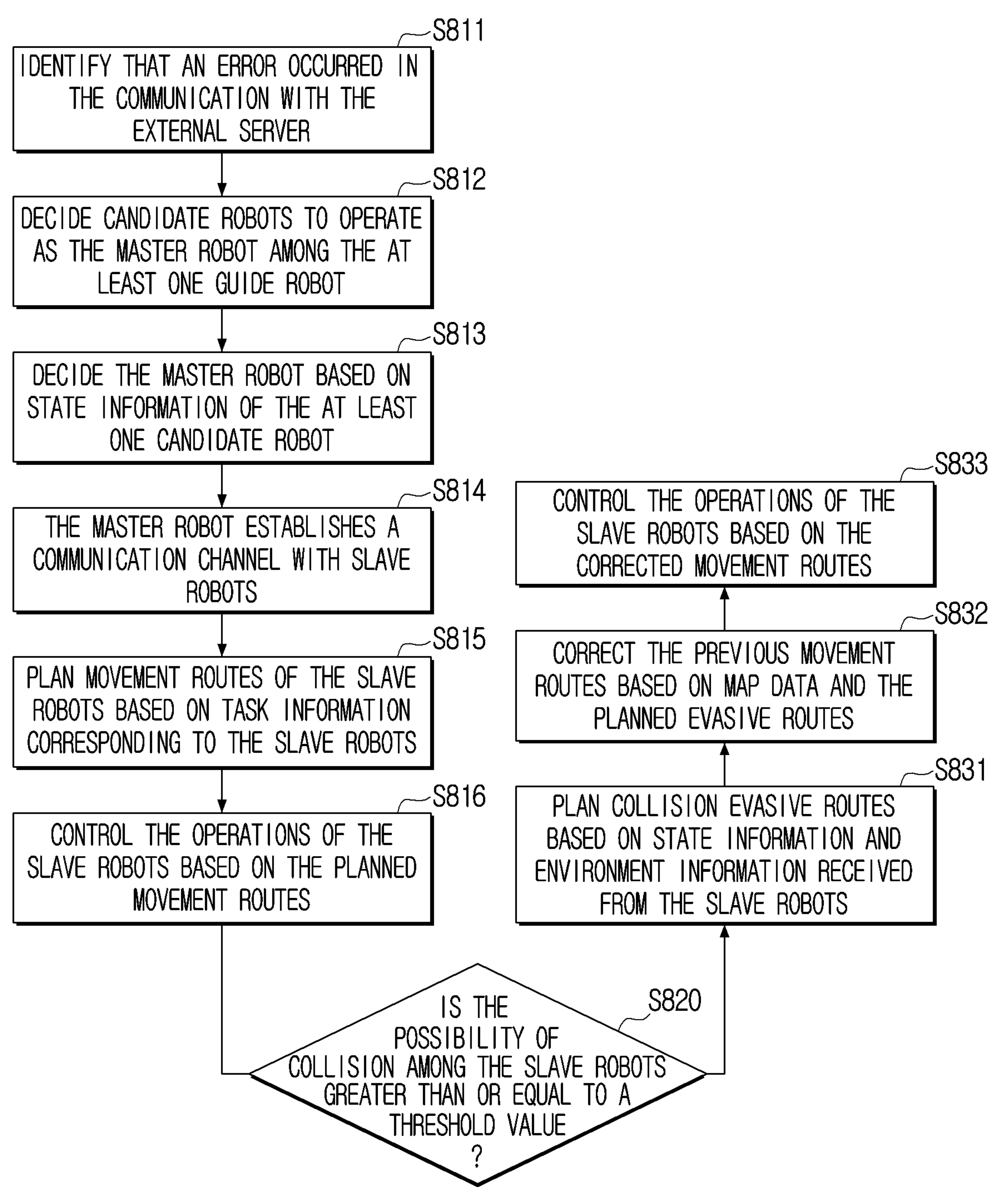
FIG. 8 is a flow chart for illustrating an operation of a master robot of planning an evasive route in consideration of possibility of collision between slave robots.

FIG. 8 is a flow chart for illustrating an operation of a master robot of planning an evasive route in consideration of possibility of collision between slave robots.

According to FIG. 8, a plurality of robots that are arranged in an indoor space and provide services to a user identify that a communication error with the external server occurred in operation S811. Then, in case it is identified that the communication error originated from an error in the external server, each robot may decide candidate robots to operate as the master robot among at least one guide type robot in operation S812.

Then, each robot decides a robot to operate as the master robot based on state information of the at least one candidate robot in operation S813. The robot operating as the master robot may establish a communication channel with slave robots other than the master robot in operation S814. For example, the master robot may establish a peer to peer (P2P) communication channel between the master robot and the slave robots.

Then, the master robot plans movement routes of each of the slave robots based on task information corresponding to each of the at least one slave robot in operation S815. Also, the master robot may control the operations of the slave robots based on the planned movement routes in operation S816.

Then, the master robot determines whether the possibility of collision among the slave robots is greater than or equal to a threshold value in operation S820. For example, the master robot may determine whether the possibility of collision among the slave robots is greater than or equal to the threshold value based on the planned movement routes of each of the slave robots. In case it is determined that the possibility of collision among the slave robots is greater than or equal to the threshold value, the master robot may receive state information and environment information of each of the slave robots from the slave robots, and replan movement routes for evading collision among the slave robots based on the received information in operation S831.

Then, the master robot corrects the previously planned movement routes based on map data of the space wherein the plurality of robots are located and the movement routes replanned for evading collision in operation S832. Lastly, the master robot transmits the information about the corrected movement routes to the slave robots, and the slave robots drive according to the corrected movement routes, and accordingly, collision among the slave robots can be prevented in operation S833.

Figure 9:
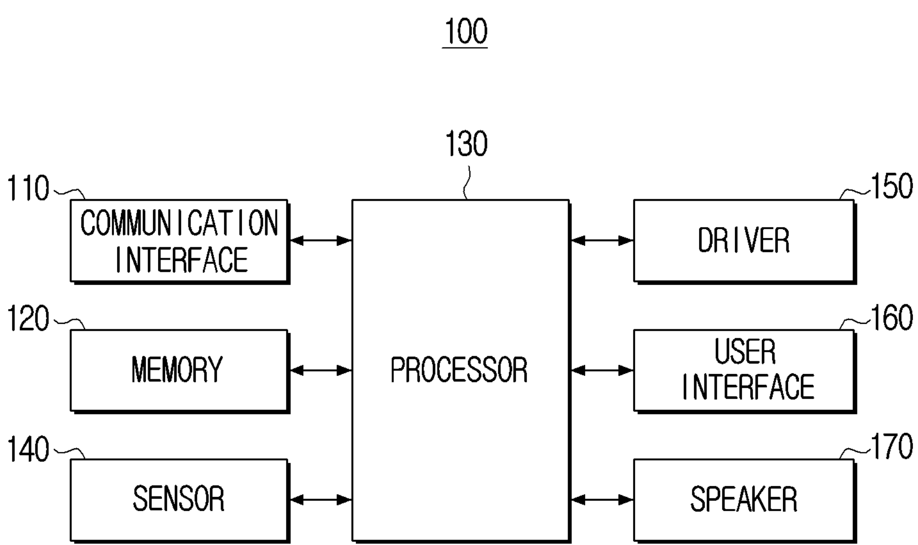
FIG. 9 is a block diagram for illustrating in detail a configuration of a robot according to one or more embodiments.

FIG. 9 is a block diagram for illustrating in detail a configuration of a robot according to one or more embodiments.

According to FIG. 9, the robot 100 may include a communication interface 110, a memory 120, a processor 130, a sensor 140, a driver 150, a user interface 160, and a speaker 170. Among the components illustrated in FIG. 9, regarding components overlapping with the components illustrated in FIG. 2, detailed explanation will be omitted.

The sensor 140 may measure a physical amount or detect an operation state of the robot 100, and convert the measured or detected information into an electric signal. The sensor 140 may include a camera (e.g., an active stereo camera), and the camera may include a lens that focuses various visible light optical signals that are reflected by an object and received onto an image sensor, and an image sensor that can detect the various visible light optical signals. Here, the image sensor may include a 3D pixel array divided into a plurality of pixels.

The processor 130 may acquire type information of an obstacle located within a threshold distance from the robot 100 and distance information between the robot 100 and the obstacle through the sensor 140 including the camera.

Also, the sensor 140 may include at least one of a distance sensor, a gesture sensor, a gyro sensor, an air barometric sensor, a magnetic sensor, an acceleration sensor, a grip sensor, a proximity sensor, a color sensor (e.g., a red, green, blue (RGB) sensor), a bio sensor, a temperature/humidity sensor, an illumination sensor, or an ultra violet (UV) sensor, and the sensor 140 according to one or more embodiments may be implemented in a form of a sensor module including at least one sensor.

The driver 150 is a device that can make the robot 100 drive. The driver 150 may adjust a driving direction and a driving speed according to control by the processor 130, and the driver 150 according to one or more embodiments may include a power generation device (e.g., a gasoline engine, a diesel engine, a liquefied petroleum gas (LPG) engine, an electric motor, for example, according to the used fuel (or the energy source)) that generates power for the robot 100 to drive, a steering device (e.g., manual steering, hydraulics steering, electronic control power steering (EPS), for example) for adjusting a driving direction, a driving device (e.g., wheels, a propeller, for example) making the robot 100 drive according to power, for example. Here, the driver 150 may be implemented while being modified according to the driving type (e.g., a wheel type, a walking type, a flying type, for example) of the robot 100.

In case the robot 100 is implemented in a robot arm type, the driver 150 may be formed as a structure for driving the robot arm, and in this case, the driver 150 may also be implemented as a structure including a plurality of driving modules corresponding to at least one joint provided on the robot arm.

The user interface 160 is a component that is involved in performing of an interaction with a user by the robot 100. For example, the user interface 160 may include at least one of a touch sensor, a motion sensor, buttons, a jog dial, or a switch, but is not limited thereto. The processor 130 according to one or more embodiments may acquire service request information related to service provision from a user through the user interface 160.

The user interface 160 may include a microphone. The microphone is a component that collects input sounds by receiving a user's voices and ambient noise signals. The microphone is a component that refers to a device that receives an input of a sound wave and generates a current of the same waveform as this. The processor 130 may convert a sound signal included in an input sound into a digital signal based on a current of a waveform generated by the microphone. The processor 130 may acquire service request information related to service provision from a user's utterance through the microphone.

The speaker 170 is a device that converts an electric acoustic signal corresponding to audio output by the robot 100, which was generated from the processor 130, into a sound wave. The speaker 170 may include a permanent magnet, a coil, and a vibration plate, and may output sounds by vibrating the vibration plate by an electromagnetic interaction generated between the permanent magnet and the coil. The processor 130 according to one or more embodiments may control the speaker 170 to output audio related to a service provided by the robot 100.

Figure 10:
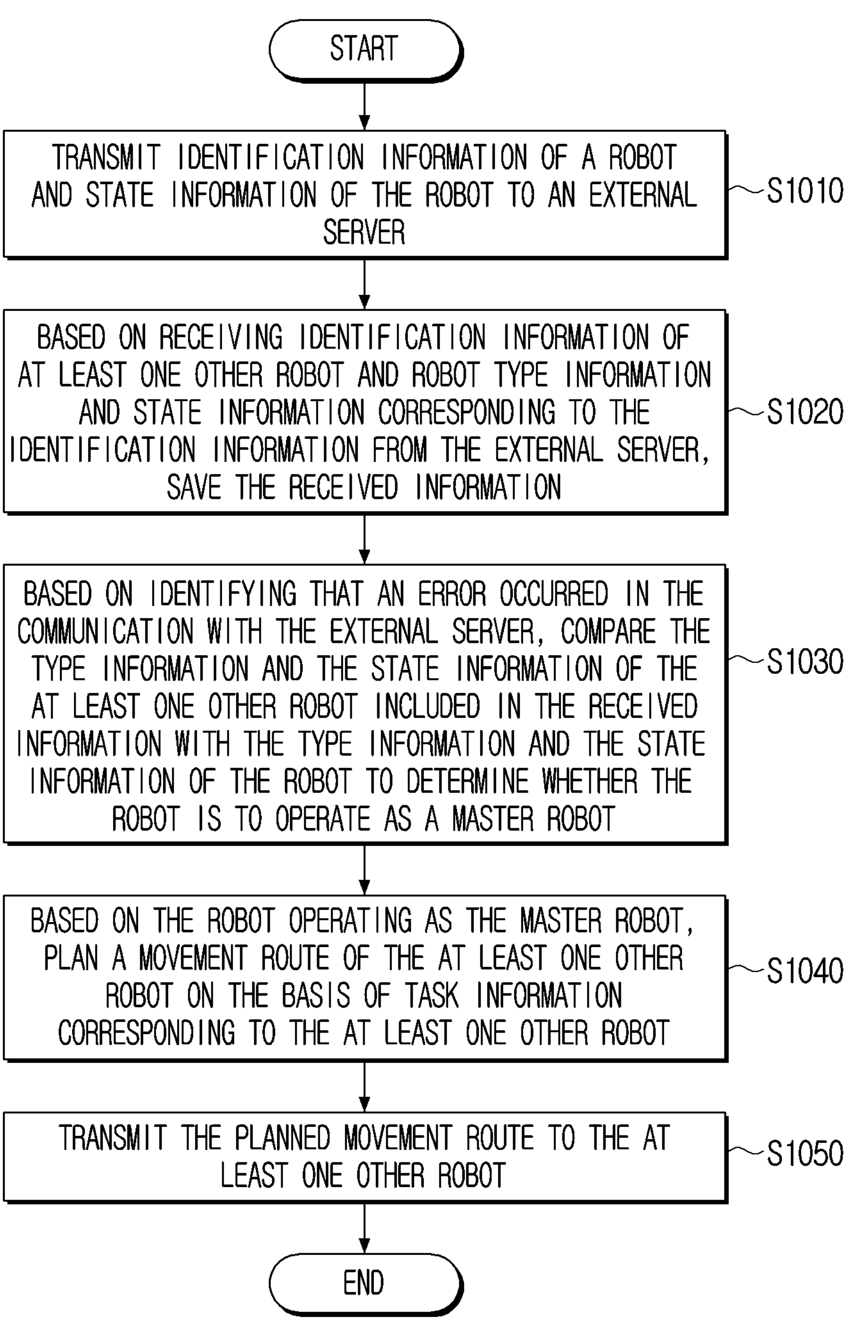
FIG. 10 is a flow chart for illustrating a controlling method according to one or more embodiments.

FIG. 10 is a flow chart for illustrating a controlling method according to one or more embodiments.

In a controlling method according to one or more embodiments, identification information of a robot and state information of the robot are transmitted to an external server in operation S1010.

Then, if identification information of at least one other robot and robot type information and state information corresponding to the identification information are received from the external server, the received information is stored in operation S1020.

Then, if it is identified that an error occurred in the communication with the external server, the type information and the state information of the at least one other robot included in the received information are compared with the type information and the state information of the robot to determine whether the robot is to operate as a master robot in operation S1030.

Then, if the robot operates as the master robot, a movement route of the at least one other robot is planned on the basis of task information corresponding to the at least one other robot in operation S1040.

Lastly, the planned movement route may be transmitted to the at least one other robot in operation S1050.

Here, the operation S1030 of determining whether the robot is to operate as the master robot may include the steps of, based on the type information of the at least one other robot and the type information of the robot, deciding at least one candidate robot from among the at least one other robot and the robot, and determining whether the robot is to operate as the master robot based on the state information of the at least one candidate robot.

Here, in the operation of deciding the candidate robot, a guide type robot may be decided as the at least one candidate robot based on the type information of the at least one other robot and the type information of the robot.

Also, the state information may include at least one of information about a battery remaining amount, information related to performance of a task, or error information, and the operation S1030 of determining whether the robot is to operate as the master robot may include the steps of identifying at least one robot having a battery remaining amount greater than or equal to a threshold value based on the information about the battery remaining amount of the at least one candidate robot, and determining whether the robot is to operate as the master robot based on the remaining state information excluding the information about the battery remaining amount of the at least one candidate robot identified based on the battery remaining amount.

The operation S1030 of determining whether the robot is to operate as the master robot may include the steps of, based on receiving the identification information of the at least one other robot and the robot type information, the state information, and driving information about the planned movement route corresponding to the identification information from the external server, updating the stored information on the basis of the received information, and based on identifying that an error occurred in the communication with the external server, determining whether the robot is to operate as the master robot on the basis of the most recently updated information based on the time point when the communication error occurred among the updated information.

Also, in the operation S1030 of determining whether the robot is to operate as the master robot, based on identifying that the communication error with the external server is due to an error in the external server, the type information and the state information of the at least one other robot included in the received information may be compared with the type information and the state information of the robot to determine whether the robot is to operate as the master robot.

Also, the controlling method may further include the steps of, based on the robot operating as the master robot, requesting the state information, environment information, and driving information about the planned movement route of the at least one other robot to the at least one other robot, and correcting the planned movement route based on the state information, the environment information, and the driving information about the planned movement route received from the at least one other robot, and transmitting the corrected movement route to the at least one other robot.

Here, the environment information may include at least one of location information of the at least one other robot, road condition information around the at least one other robot, obstacle type information, or distance information from an obstacle.

The controlling method may further include the step of, based on identifying that the robot is not the master robot, transmitting the state information and environment information of the robot.

The methods according to one or more embodiments may be implemented in forms of applications that can be installed on conventional robots.

Also, the methods according to one or more embodiments may be implemented just with software upgrade, or hardware upgrade of conventional robots.

In addition, one or more embodiments can be performed through an embedded server provided on a robot, or performed through at least one external server.

According to one or more embodiments, even in case an error occurred in communication between a robot and an external server, a plurality of robots can provide smooth services according to control by a master robot, and thus a user's convenience can be improved.

One or more embodiments may be implemented in a recording medium that can be read by a computer or a device similar to a computer, by using software, hardware, or a combination thereof. In some cases, the embodiments described in this specification may be implemented as the processor 130 itself. According to implementation by software, the embodiments such as procedures and functions described in this specification may be implemented as separate software modules. Each of the software modules may perform one or more functions and operations described in this specification.

Computer instructions for performing processing operations of the robot 100 according to one or more embodiments may be stored in a non-transitory computer-readable medium. Computer instructions stored in such a non-transitory computer-readable medium may make the processing operations at the robot 100 according to one or more embodiments performed by a machine, when the instructions are executed by the processor of the machine.

A non-transitory computer-readable medium refers to a medium that stores data semi-permanently, and is readable by machines, but not a medium that stores data for a short moment such as a register, a cache, and a memory. As examples of a non-transitory computer-readable medium, there may be a CD, a DVD, a hard disc, a blue-ray disc, a USB, a memory card, a ROM, and the like.

Also, while example embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. A robot comprising:

a communication interface;

a memory storing at least one instruction and first type information of the robot; and at least one processor;

wherein the at least one instruction, when executed by the at least one processor individually or collectively, causes the robot to:

transmit first identification information of the robot and first state information of the robot to an external server via the communication interface, based on receiving, from the external server via the communication interface, information of at least one other robot comprising second identification information of the at least one other robot, second type information of the at least one other robot, second state information of the at least one other robot, and driving information about a planned movement route of the at least one other robot, store the received information in the memory and update information corresponding to the at least one other robot stored in the memory based on the received information, identify that a communication error has occurred in communication between the robot and the external server via the communication interface, based on identifying that the communication error originated from the external server, determine whether the robot is to operate as a master robot by comparing the second type information and the second state information with the first type information and the first state information, respectively, based on most recently updated information stored in the memory based on a time point when the communication error occurred, based on determining that the robot is to operate as the master robot, plan a movement route of the at least one other robot based on task information of the at least one other robot, and transmit, via the communication interface, the planned movement route to the at least one other robot.

2. The robot of claim 1, wherein the at least one instruction, when executed by the at least one processor individually or collectively, causes the robot to:

based on the second type information and the first type information, identify at least one candidate robot from among the at least one other robot and the robot, and determine whether the robot is to operate as the master robot based on state information of the at least one candidate robot.

3. The robot of claim 2, wherein the at least one instruction, when executed by the at least one processor individually or collectively, causes the robot to:

identify a guide type robot as the at least one candidate robot based on the second type information and the first type information.

4. The robot of claim 2, wherein each of the first state information and the second state information comprises:

at least one of information about a battery remaining amount, information related to performance of a task, or error information, and wherein the at least one instruction, when executed by the at least one processor individually or collectively, causes the robot to:

identify, from among the at least one candidate robot, at least one robot having the battery remaining amount greater than or equal to a threshold value based on the information about the battery remaining amount of the at least one candidate robot, and determine whether the robot is to operate as the master robot based on at least one of the information related to performance of the task of the at least one identified robot or the error information of the at least one identified robot.

5. The robot of claim 1, wherein the at least one instruction, when executed by the at least one processor individually or collectively, causes the robot to:

based on the robot operating as the master robot, request information from the at least one other robot comprising the second state information, environment information of the at least one other robot, and the driving information about the planned movement route of the at least one other robot, correct the planned movement route of the at least one other robot based on the requested information being received, and transmit, via the communication interface, the corrected planned movement route to the at least one other robot.

6. The robot of claim 5, wherein the environment information comprises:

at least one of location information of the at least one other robot, road condition information around the at least one other robot, obstacle type information, or distance information from an obstacle.

7. The robot of claim 1, wherein the at least one instruction, when executed by the at least one processor individually or collectively, causes the robot to:

based on identifying that the robot is not the master robot, transmit, via the communication interface, the first state information and environment information of the robot.

8. A method of controlling a robot, the method comprising:

transmitting first identification information of the robot and first state information of the robot to an external server;

based on receiving, from the external server, information comprising second identification information of at least one other robot, second type information of the at least one other robot, second state information of the at least one other robot, and driving information about a planned movement route of the at least one other robot, storing the received information and updating stored information corresponding to the at least one other robot based on the received information of the at least one other robot;

identifying that a communication error has occurred in communication between the robot and the external server, based on identifying that the communication error originated from the external server, determining whether the robot is to operate as a master robot by comparing the second type information and the second state information with first type information of the robot and the first state information based on most recent updated information based on a time point when the communication error occurred;

based on determining that the robot is to operate as the master robot, planning a movement route of the at least one other robot based on task information of the at least one other robot; and transmitting the planned movement route to the at least one other robot.

9. The method of claim 8, wherein the determining whether the robot is to operate as the master robot comprises:

based on the second type information and the first type information, identifying at least one candidate robot from among the at least one other robot and the robot; and determining whether the robot is to operate as the master robot based on state information of the at least one candidate robot.

10. The method of claim 9, wherein the identifying the at least one candidate robot comprises:

identifying a guide type robot as the at least one candidate robot based on the second type information and the first type information.

11. The method of claim 9, wherein each of the first state information and the second state information comprises:

at least one of information about a battery remaining amount, information related to performance of a task, or error information, and wherein the determining whether the robot is to operate as the master robot comprises:

identifying, from among the at least one candidate robot, at least one robot having the battery remaining amount greater than or equal to a threshold value based on the information about the battery remaining amount of the at least one candidate robot; and determining whether the robot is to operate as the master robot based on at least one of the information related to performance of the task of the at least one identified robot or the error information of the at least one identified robot.

12. The method of claim 8, further comprising:

based on the robot operating as the master robot, requesting, from the at least one other robot, information comprising the second state information, environment information of the at least one other robot, and the driving information about the planned movement route of the at least one other robot;

correcting the planned movement route of the at least one other robot based on the requested information being received; and transmitting the corrected planned movement route of the at least one other robot to the at least one other robot.

13. The method of claim 12, wherein the environment information comprises at least one of location information of the at least one other robot, road condition information around the at least one other robot, obstacle type information, or distance information from an obstacle.

14. The method of claim 8, further comprising:

based on identifying that the robot is not the master robot, transmitting the first state information and environment information of the robot.

15. A non-transitory computer-readable recording medium storing therein computer-readable instructions, the computer-readable instructions being used for executing a method, the method comprising:

transmitting first identification information of a robot and first state information of the robot to an external server;

based on receiving, from the external server, information comprising second identification information of at least one other robot, second type information of the at least one other robot, second state information of the at least one other robot, and driving information about a planned movement route of the at least one other robot, storing the received information and updating stored information corresponding to the at least one other robot based on the received information of the at least one other robot;

identifying that a communication error has occurred in communication between the robot and the external server, based on identifying that the communication error originated from the external server, determining whether the robot is to operate as a master robot by comparing the second type information and the second state information with first type information of the robot and the first state information based on most recent updated information based on a time point when the communication error occurred;

based on determining that the robot is to operate as the master robot, planning a movement route of the at least one other robot based on task information of the at least one other robot; and transmitting the planned movement route to the at least one other robot.

16. The robot of claim 1, wherein the at least one instruction, when executed by the at least one processor individually or collectively, causes the robot to:

periodically receive, via the communication interface, the information of the at least one other robot from the external server, and update the received information stored in memory, and wherein the determining whether the robot is to operate as the master robot is based on comparing the second type information and the second state information that was most recently updated before the time point when the communication error occurred.

* * * * *